United States Patent
Sommerville et al.

(10) Patent No.: US 12,510,998 B2
(45) Date of Patent: Dec. 30, 2025

(54) VIRTUAL BUTTONS FOR AUGMENTED REALITY LIGHT GUIDED ASSEMBLY SYSTEM AND CALIBRATION METHOD

(71) Applicant: LightGuide, Inc., Wixom, MI (US)

(72) Inventors: William T. Sommerville, Wixom, MI (US); Mikayla M. Ray, Farmington Hills, MI (US); Marina M. Fietsam, Leonard, MI (US)

(73) Assignee: LightGuide, Inc., Wixom, MI (US)

( * ) Notice: Subject to any disclaimer, the term of this patent is extended or adjusted under 35 U.S.C. 154(b) by 185 days.

(21) Appl. No.: 18/332,206

(22) Filed: Jun. 9, 2023

(65) Prior Publication Data
US 2023/0409149 A1 Dec. 21, 2023

Related U.S. Application Data

(60) Provisional application No. 63/350,544, filed on Jun. 9, 2022.

(51) Int. Cl.
*G06F 3/042* (2006.01)

(52) U.S. Cl.
CPC .................. *G06F 3/0426* (2013.01)

(58) Field of Classification Search
None
See application file for complete search history.

(56) References Cited

U.S. PATENT DOCUMENTS

| | | | |
|---|---|---|---|
| 11,079,278 B1 | 8/2021 | Bogacz et al. | |
| 2009/0115721 A1* | 5/2009 | Aull | G06F 3/0425 |
| | | | 348/E5.029 |
| 2016/0364007 A1 | 12/2016 | Kamovich et al. | |
| 2020/0049489 A1 | 2/2020 | Armstrong et al. | |
| 2021/0192759 A1 | 6/2021 | Lang | |

FOREIGN PATENT DOCUMENTS

WO 2021112830 A1 6/2021

OTHER PUBLICATIONS

International Search Report and Written Opinion from corresponding Patent Cooperation Treaty (PCT) Application No. PCT/IB23/55984, completed Aug. 15, 2023 and mailed Sep. 18, 2023.

* cited by examiner

*Primary Examiner* — Krishna P Neupane
(74) *Attorney, Agent, or Firm* — Gardner, Linn, Burkhart & Ondersma LLP

(57) ABSTRACT

A method for calibrating a sensor and projector with respect to a work area, the method including positioning a projector to project light indicators at locations in the work area and positioning a sensor with respect to the projector such that the sensor's field of view includes a selected portion of the work area. The sensor captures video or encoded data of activities at the work area. The sensor and projector are aimed at a set of coordinates upon the work area and the associated aim-point coordinates of the sensor and projector are recorded. The sensor and projector are aimed at additional sets of coordinates upon the work area, and the associated aim-point coordinates are recorded until a sufficient quantity of aim-point coordinates have been collected to form a calibration data set sufficient to calibrate the sensor and projector to the work area.

20 Claims, 8 Drawing Sheets

PRE-ASSEMBLE
FIG. 1A
(PRIOR ART)
SELECT
FIG. 1B
(PRIOR ART)
INSERT
FIG. 1C
(PRIOR ART)
ASSEMBLE
FIG. 1D
(PRIOR ART)
PICK
FIG. 1E
(PRIOR ART)
GUAGE
FIG. 1F
(PRIOR ART)
TORQUE
FIG. 1G
(PRIOR ART)
FIG. 1H
(PRIOR ART)
FIG. 1I
(PRIOR ART)
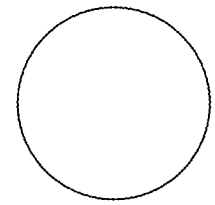
FIG. 1J
(PRIOR ART)
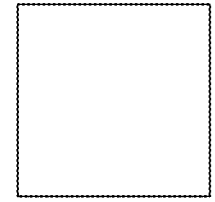
FIG. 1K
(PRIOR ART)
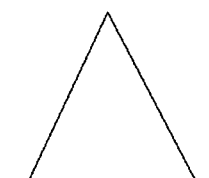
FIG. 1L
(PRIOR ART)

VIRTUAL BUTTONS FOR AUGMENTED REALITY LIGHT GUIDED ASSEMBLY SYSTEM AND CALIBRATION METHOD

CROSS REFERENCE TO RELATED APPLICATION

The present application claims priority of U.S. provisional application Ser. No. 63/350,544, filed Jun. 9, 2022, which is hereby incorporated herein by reference in its entirety.

FIELD OF THE INVENTION

The present invention is directed to improvements in a system for guiding an individual in the performance of operational steps, and in particular a system that provides augmented reality virtual buttons.

BACKGROUND OF THE INVENTION

Light guided systems make use of augmented realty in order to visually guide users through operational steps such as in the assembly, inspection, kitting, and/or training involved in manual processes. Numerous activities involve the performance of pre-designated operational steps to properly complete a particular task, with some such activities needing to be completed within a specified time or standard time allowance. The performance of such activities can be improved through the use of light guided systems that provide visual prompts and indicators to guide a user in the performance of their work. The light guide systems may be equipped with augmented reality "virtual buttons" by which users may input responses (such as, indicating a task is complete or that they are ready to start a new task), where a virtual button includes a projected image with which the user may provide an input to the system. The virtual button may be an image projected onto a surface that is visualized with a camera that detects when the user places, for example, their hand or finger over the projected image. The virtual button may resemble a graphical button in a computer application, with a graphical shape, symbol, and/or text to indicate the desired behavior when pressing the virtual button, or else it may be a flashing/blinking/solid white highlight of a part or area where a person should put their hand, a part, or a tool as part of the desired process.

SUMMARY OF THE INVENTION

Embodiments of the present invention provide methods and an apparatus to improve the calibration of virtual buttons such that the position of a virtual button with respect to a projector and associated image sensor can be adjusted within a field of view of a work area without requiring a recalibration. In one embodiment, the projector and associated sensor are adjacent to each other. In another embodiment, the adjacent projector and associated sensor are integrated into a single housing. In a further embodiment, the projector and associated sensor are positioned with respect to each other.

A guide system for providing visual indicators and virtual buttons to an individual to guide actions and feedback in accordance with an aspect of the invention includes at least one directional light device selectively operable to project and target at least one indicating light on a work area, a sensor located near each directional light device, and a controller. The sensor is positioned such that a field of view captures desired portions of the work area to capture video of the actions of a worker performing a task at the work area. The projector is configured to project light indicators that are graphical geometric shapes. The controller includes a memory and is configured to control the projector and to monitor the captured video of the sensor. The controller is configured to monitor the captured video for the worker to place a hand or a finger over the projected first light indicator. The controller is operable to determine that the first worker's hand or finger over the projected first light indicator is a user selection. The graphical geometric shape indicates a selectable feedback indication, and the graphical geometric shape is a virtual button. The controller is configured to direct the projector to reposition the first light indicator to a different target location in the work area. The controller is configured to use calibration data stored in the memory to maintain a calibration of the sensor and projector to the work area. The controller is configured to direct the projector to move the first light indicator to a newly selected location in the work area without requiring a recalibration of the sensor and projector with respect to the work area.

According to an aspect of the present invention, a method for calibrating a sensor and projector with respect to a work area includes positioning a projector to project light indicators at locations in the work area and positioning a sensor with respect to the projector such that the sensor's field of view includes a selected portion of the work area. The sensor captures video of activities at the work area. The sensor and projector are aimed at a set of coordinates upon the work area and the associated aim-point coordinates of the sensor and projector are recorded. The sensor and projector are aimed at additional sets of coordinates upon the work area, and the associated aim-point coordinates of the sensor and projector are recorded until a sufficient quantity of aim-point coordinates for the sensor and projector have been collected to form a calibration data set sufficient to calibrate the sensor and projector to the work area.

In an aspect of the present invention, the graphical geometric shape includes at least one of numbers, words, alphanumeric characters, and a drawing image, and the graphical geometric shape defines a particular user feedback indication. Additionally, the user feedback indication can be used to define a user-selectable work status feedback indication.

In another aspect of the present invention, the controller includes a programmable logic controller.

In a further aspect of the present invention, the sensor and projector are positioned adjacent each other within a single housing. In another embodiment, the sensor and projector are adjacent and contained within a single package.

In another aspect of the present invention, the light guide system includes a plurality of projectors, each configured to project associated light indicators at one or more additional targeted locations in the work area. At least two of the plurality of projectors have overlapping fields of view, where each of the associated light indicators are graphical geometric shapes. The light guide system also includes a plurality of sensors, each positioned with respect to a corresponding one of the plurality of projectors. Each of the sensors is positioned to have a corresponding field of view of a selected portion of the work area, and each of the sensors is configured to capture video of the actions of the first worker performing a task at the work area.

In yet another aspect of the present invention, the sensor is a 3D sensor and is configured to generate a 3D point cloud. The 3D point cloud may also include 3D encoded data.

These and other objects, advantages, purposes and features of the present invention will become apparent upon review of the following specification in conjunction with the drawings.

BRIEF DESCRIPTION OF THE DRAWINGS

FIGS. 1A-1L illustrate exemplary images that may be projected by the light sources of the assembly guide system of FIG. 1;

DESCRIPTION OF THE PREFERRED EMBODIMENTS

The present invention will now be described with reference to the accompanying figures, wherein numbered elements in the following written description correspond to like-numbered elements in the figures. Methods and systems of the exemplary embodiments provide for the display and monitoring of visual indicators and virtual buttons to an individual to guide actions and provide an opportunity for user feedback, using a guide system, such as an operational guide system as disclosed in U.S. Pat. No. 7,515,981 (hereinafter the '981 patent), which is hereby incorporated by reference in its entirety. The guide system in accordance with the present invention includes a projector paired with an associated image sensor ("sensor"). As discussed herein, an exemplary image sensor or sensor may include a conventional video camera for capturing video images, 3D video cameras for capturing 3D images, 3D sensors for capturing 3D point clouds and/or 3D encoded data, and the like. The projector displays within a field of view one or more projected images, including one or more virtual buttons, and the sensor monitors the user's interaction with the one or more virtual buttons. By calibrating the projector and sensor with respect to each other and with respect to a shared field of view of a work area, an exemplary control system is able to reposition a selected virtual button without requiring the projector and/or sensor to recalibrate for the new position of the selected virtual button.

Figure 1:
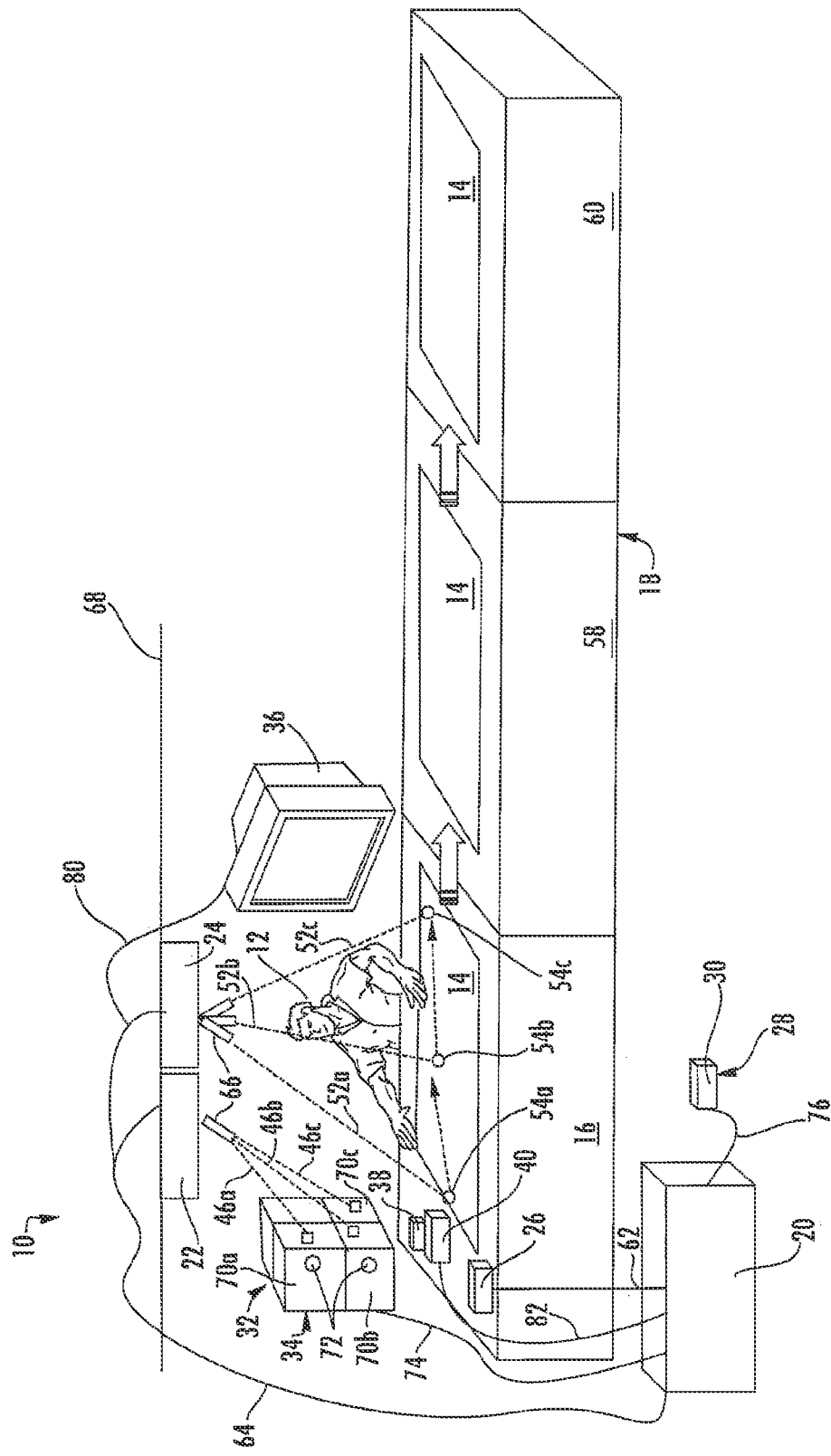
FIG. 1 is a perspective view of an operational guide system constructed as an assembly guide system at a work station of an assembly line.
Figure 2:
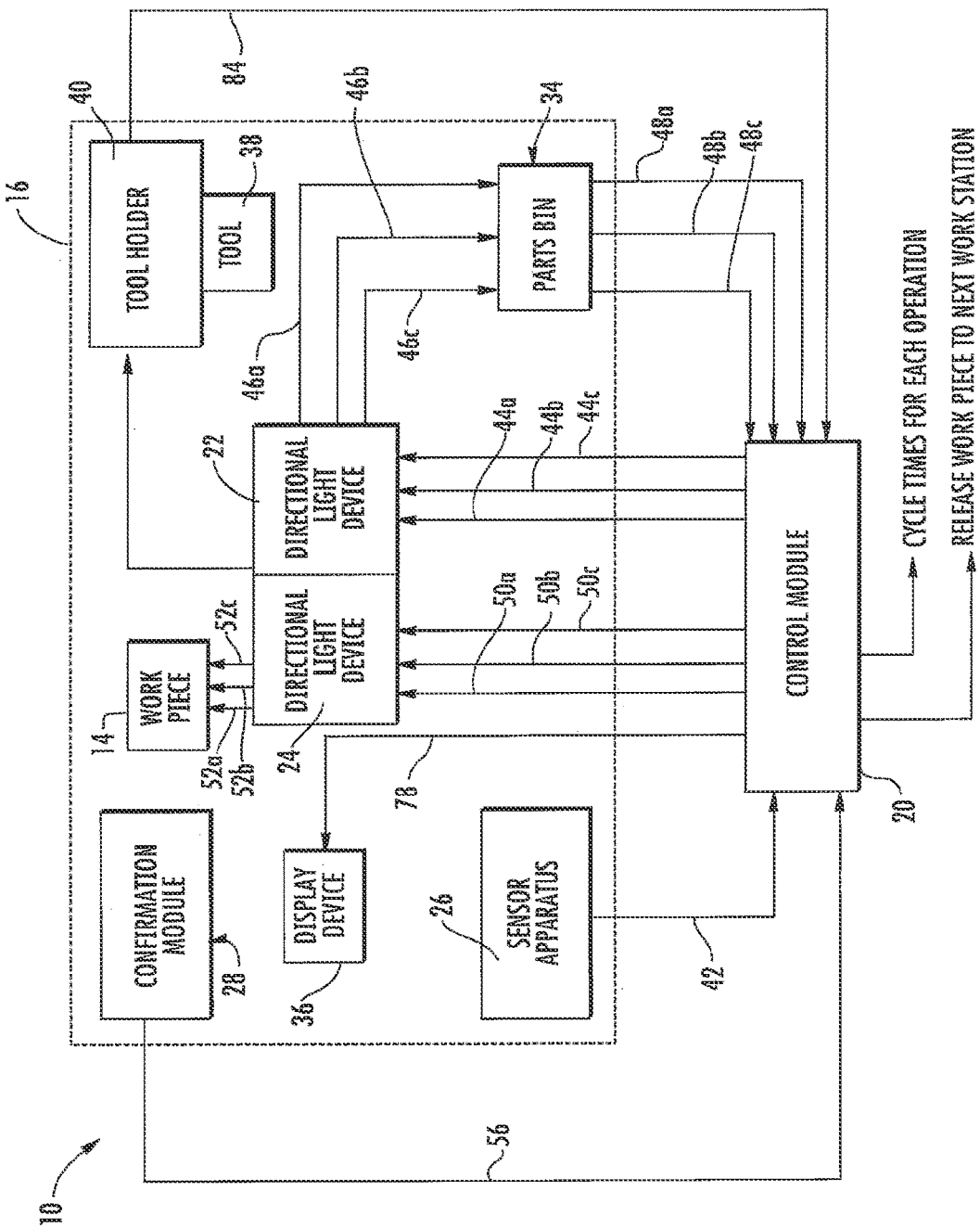
FIG. 2 is a schematic illustration of the operation of the assembly guide system of FIG. 1.

By way of background with reference to FIGS. 1-2, the '981 patent discloses an operational guide system or guide system 10 in connection with the providing of visual indicators to an operator 12 performing one or more assembly actions on a work piece 14 at a work station 16 of an assembly line 18. The illustrated guide system 10 includes a controller or a control module 20, two directional light devices 22, 24, a sensor apparatus 26, and a confirmation module or device or element 28, shown as a foot pedal 30. Guide system 10 includes a component location 32, which is illustrated as a parts bin 34, a display device 36, and a tool 38 and tool holder 40.

Guide system 10 is operable to selectively provide indicating lights 46, 52 to guide an operator in the selection and/or assembly of parts to work piece 14. The system 10 is also or alternatively operable in response to one or more confirmation signals, such as confirmation signals 48, 56, and/or 84 of FIG. 2 that are described below, which may be manually or automatically supplied to control module 20 to verify completion of a particular operation or task. The system 10 is further operable via display device 36 to provide and relay information to operator 12 such as, for example, a listing of steps needing completion, work instructions, images of a work piece, videos, and/or warnings regarding a missed or improperly performed assembly step. Additional details of the operational guide system or guide system 10 may be found in the '981 patent.

Light sources 66 may be constructed to project a focused, coherent beam of light at a desired location. Laser light sources may be class 3 or lower lasers for employment within a visual setting for operators. Alternatively, light sources other than lasers may be used and still function as intended, such as standard projectors, incandescent lights, light emitting diodes (LEDs), or the like. An exemplary laser light source may project a stationary point of light or quickly move to outline a shape, symbol, letter, word, or an animated version of a shape, symbol, letter, or word.

Light sources 66 may be constructed such that they produce light of differing color from each other to provide further visual cues to the operator 12 while working at work station 16. Furthermore, light sources may be adapted to project animated images or videos onto a surface, such as a surface of the work piece 14, assembly line 18, or a work station 16, 58, 60. The projected animated images or videos may be, for example, a training video, and may be in an .mpeg, .wmv, gif, or other such file format provided by or stored in, for example, a control module of an operational guide system.

Referring to FIGS. 1A-1L, the directional light devices 22, 24 may also include known optical effect devices for fanning or adapting or configuring the projected indicating lights 46, 52 produced by the light sources 66 into a desired shape, pattern, or form at the point or location at which the indicating light 46, 52 impinges the component location 32 or operational step location 54. For example, the indicating light may initially be projected as a geometric shape (FIGS. 1J-1L), such as a circle, about a particular location to quickly attract the operator's attention, and then focus to a point or circle of smaller diameter at the specific location. The indicating light may also be projected to produce alpha numeric characters, such as shown in FIGS. 1A-1I, blink, and/or produce rotating images. For example, sequential numbers may be projected where each number indicates a step in the assembly action being performed by the operator at the work station, or part numbers or textual information may be projected to provide written guidance to the operator. Indicating lights projected by light sources, as described in more detail below, may further be configured to display videos or pictures or animation on the surface upon which the indicating light impinges. The configured images form a type of display graphic or visual display feature ("VDF") exhibited by an indicating light, such as indicating light 46 or 52, when projected onto a surface, with FIGS. 1A-1L representing exemplary display graphics or VDFs.

It should also be appreciated that numerous alternative uses and/or configurations of the operational guide system exist. For example, an operational guide system may be used to pick and package products into a shipping container, such as a bag or box, for fulfilling an order, such as part kitting at order fulfillment centers, supermarkets, part bin loading, assembly line sequencing, product changeovers, or the like. The operational guide system may also be used in a food production or preparation process in which, for example, the indicating lights may be projected onto sequentially required ingredients and may be timed depending upon when a particular ingredient is to be added. An exemplary virtual button projected into a bin would be associated with certain behaviors or actions specific to part picking, such as, the virtual button turning the color green with an associated speaker emitting an audible beep after a hand is detected in the bin. Alternatively, haptic feedback can be used. Whether audible or haptic, such feedback can be used to enable the operator to be aware that the system detected their hand while directing their gaze somewhere else, which generates productivity improvements in their work. The projected virtual button image may be configured to "react" to the vision tool detecting a hand, sometimes getting bigger and brighter so that the operator know that their hand was detected. Latching buttons might change to a green color and display a border to checkmark to indicate the button is activated and remain that way until a hand approaches it a second time. The operation of several bin picking virtual buttons could be coordinated with each other to cause a controller to advance to another step in the process once all of the virtual buttons turn the color green, regardless of the order in which they were picked. The vision tool may also require a certain motion or gesture to active the virtual button, in order to reduce inadvertent activation of the virtual button. This may be an exemplary swipe gesture from left to right, a controlled lower and raising of the hand, recognition of certain fingers outstretched, holding the hand in position for a specific period of time, two-handed activation of two different virtual buttons, or avoiding the hand entering certain regions near the virtual button as it enters or leaves the virtual button.

More advanced aids can also be employed, for example, wherein in addition to turning the color green when the hand enters the bin, a projected virtual symbol is seen to move from that bin location towards the next desired bin location, drawing the operator's attention in the direction of the next bin. Likewise, the emitted audible beep may come from that direction. If the system is trained to recognize the shape of a parts bin, box, or dunnage, the projected image may be adjusted to highlight as much of the whole bin as possible, for maximum ability of the operator to see that bin from a distance and at different approaches. An exemplary camera would be trained to look for hands or arms reaching into the bin from any likely angles of approach.

Figure 3:
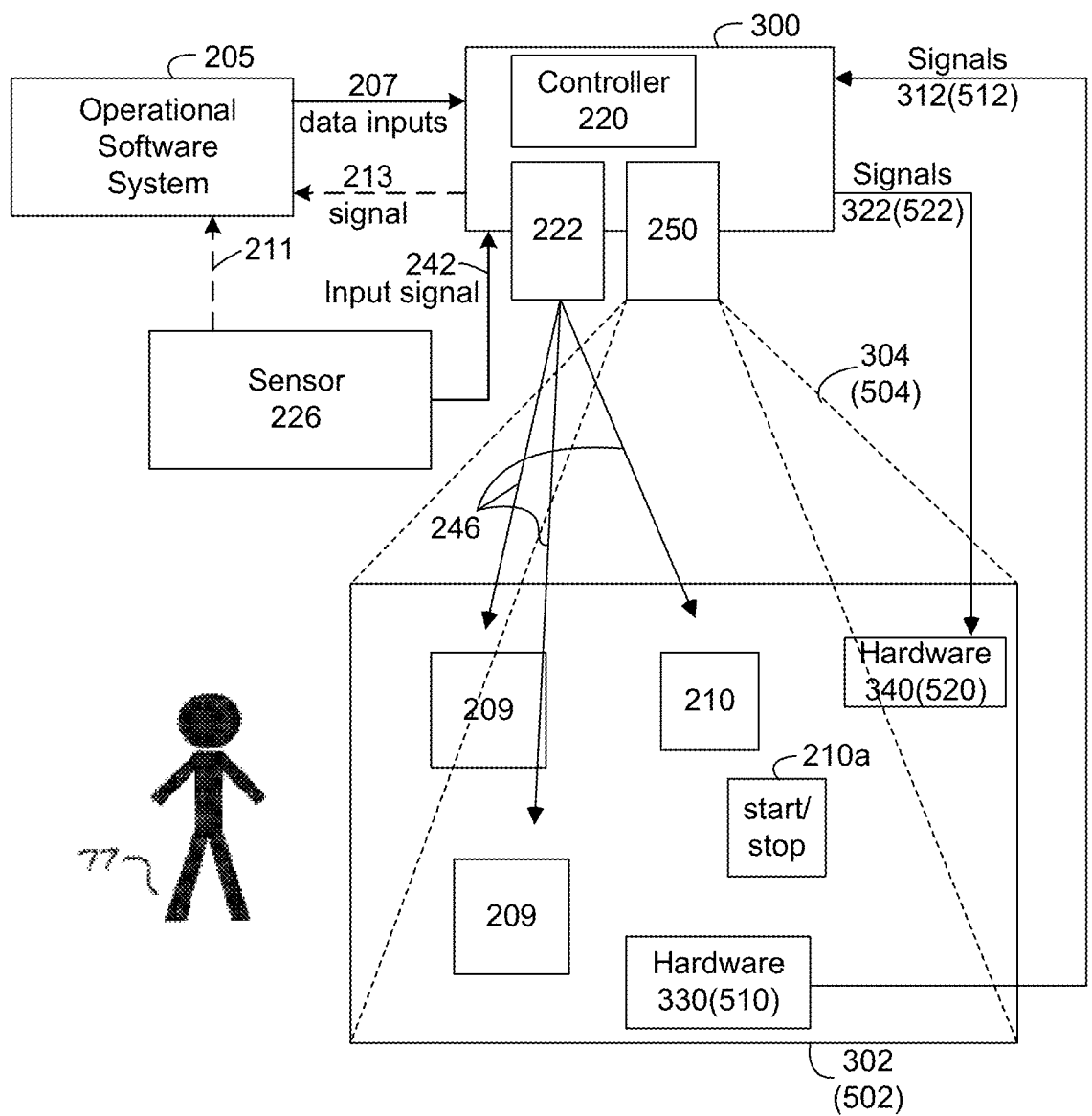
FIG. 3 is a block diagram illustrating a guide system with a paired projector and sensor for augmented reality image projection and monitoring in accordance with the present invention.

FIG. 3 discloses another operational guide system 300, where guide system 300 shares similar components or elements with guide system 10, such that not all of the specific construction and alternatives are discussed with regard to guide system 300. Guide system 300 is integrated or interfaced with an operational program system or operational software system or manufacturing execution system (MES) 205, such as in accordance with U.S. Pat. No. 9,658,614, which is incorporated herein by reference, whereby operational software system 205 may provide operational guide system 300 with input signals or data inputs 207 to create, control or cause the projector 222 of operational guide system 300 to project specific display images 209 and interactive images (e.g., virtual buttons) 210 via projected indicating light(s) 246 and/or project in specific locations. Manufacturing, production, and/or assembly environments frequently employ operational software systems 205, which are sometimes referred to as enterprise resource planning (ERP) systems, used in association with product planning, production scheduling, inventory control, and the like. These systems are generally defined as control systems for managing and monitoring work-in-process in a factory environment, such as on a factory floor. Examples of such operational software systems include, but are not limited to, SAP® business software provided by SAP AG of Germany, PROPLANNER® business software provided by Proplanner Corp. of Iowa, USA, as well as systems such as General Motor Corporation's Global Enterprise Production Information and Control System (GEPICS). Such operational software systems 205 can include data that may be utilized by guide system 300 to assist in guiding the activities of an individual (e.g., worker/operator 77) without the necessity of having such information separately programmed or pre-programmed into guide system 300.

Operational software system 205 may still further include images of user feedback buttons, known as "virtual buttons," for an enhanced augmented reality environment for the worker 77. Virtual button images 210 may be used to improve the user experience by projecting "buttons" upon a work area 302 (see FIG. 4). Such virtual button images 210 can be "pressed" by the user/operator 77 when 3D sensors are used to monitor the projected virtual button image 210. An exemplary 3D sensor generates 3D images, 3D point clouds, or 3D encoded data based on time-of-flight calculations. Alternatively, an exemplary 3D sensor is a structured light sensor. In a further alternative, an exemplary 3D sensor is a stereo sensor with a pair of sensors. In a further alternative, exemplary 3D information may be obtained using regular cameras (i.e., USB webcams) stationed around the area such that the operators' hands can be seen by at least two sensors at any given time. In a further alternative, exemplary 3D information can be obtained using only one regular USB webcam, or the like, that can determine depth and orientation of objects using their apparent size and orientation using machine learning or mathematical algorithms. In one exemplary embodiment, a calibrated 3D camera or sensor can directly measure the work surface topology and enable the system to locate features to project onto as well as distort the projected images to achieve the desired look at different shaped or angled surfaces.

Figure 4A:
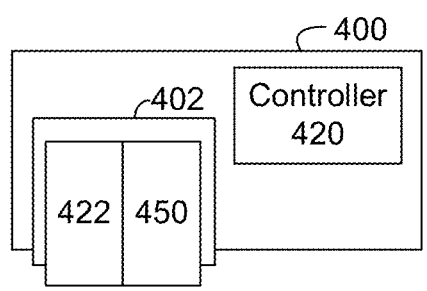
FIG. 4A is a block diagram of an alternative guide system with an exemplary projector and sensor combination in accordance with the present invention.
Figure 4:
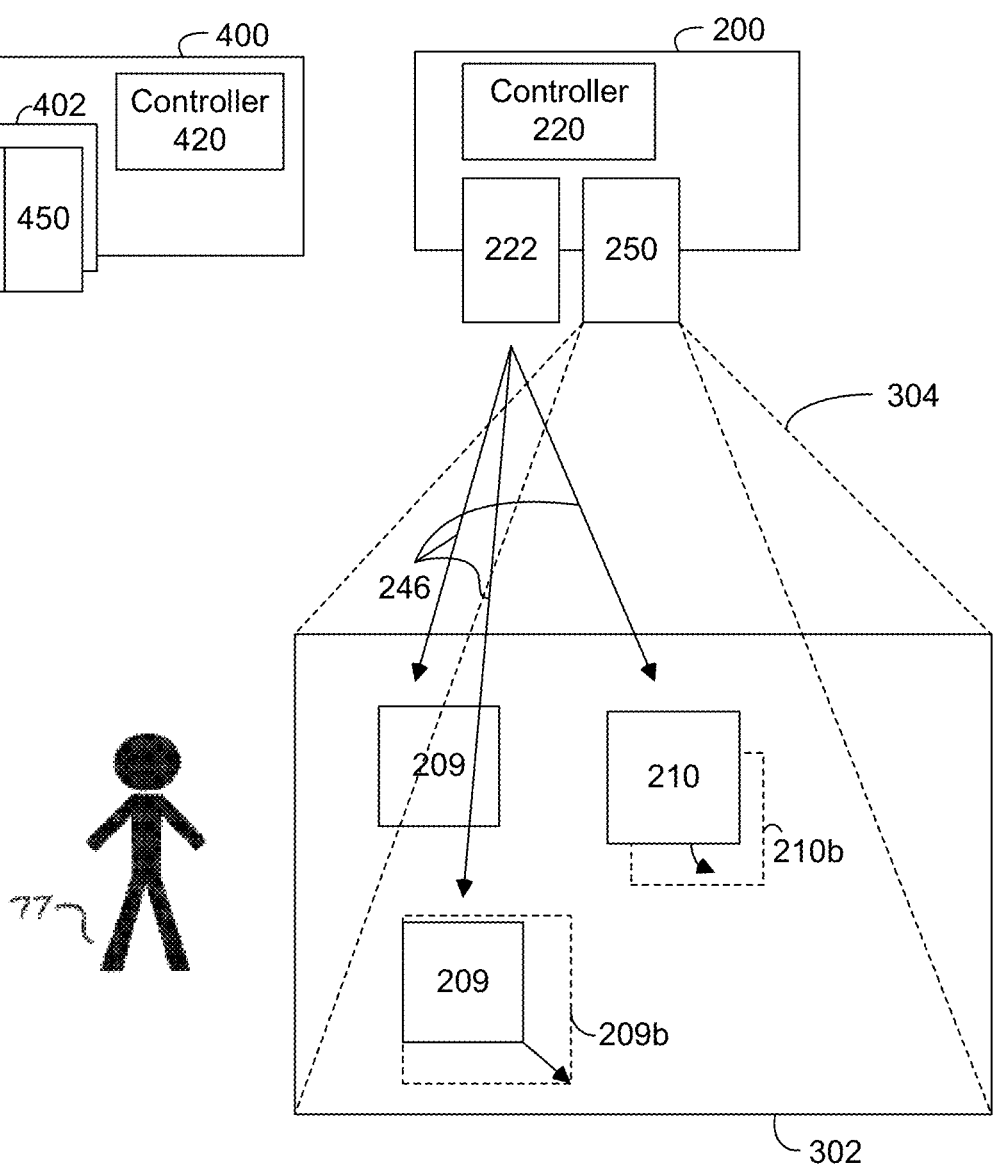
FIG. 4 is a perspective view of the guide system of FIG. 3 and an exemplary positioning of the projector and sensor with a work area of an assembly line in accordance with the present invention.

FIGS. 3 and 4 illustrate an exemplary guide system 300 that includes enhanced augmented reality displays that include informational display images 209, user-feedback "virtual button" images 210, and other feedback devices, e.g., hardware 330 used in a work area/work station 302 that outputs digital or analog signals 312 that are received and analyzed by the controller 220 of the guide system 300. The hardware 330 may include, for example, electronic tools, gauges, or sensors, such as light curtains, proximity switches, vibration sensors, and the like, as well as other electronic components from which a data signal could be generated. These signals 312 can be used by the controller 220 to aid in determining when to advance the work instructions to perform the work task. Thus, the signals 312 may be used to indicate via display images 209 information or instructions to the worker/operator 77.

The output signals 312 may be used to control or modify the operation of physical hardware at the work area/work station 302. For example, if the worker/operator 77 performs a particular task with a particular piece of hardware 340 (e.g., a torque tool) to perform four tasks with a timed duration between one minute and two minutes (torqueing four bolts), the system may enable hardware 340 at the one minute mark via control signals 322, wait for four positive activity signals (e.g., torque tool activation signals when using the torque tool to torque four bolts) to come back via the signals 312, disable the hardware 340 at this point via control signals 322, and then provide feedback to the worker/operator 77 about any pass/fail status of the four tasks completed with the hardware 340 as well as providing how long after the 1 minute mark the worker/operator 77 took to complete all four tasks (torque operations).

In an aspect of the present invention, the one or more projectors 222 may be of a kind similar to those discussed herein. For example, the projector may be a directional light device 222, which includes a light source for projecting light 246 at targeted locations. As illustrated in FIGS. 3 and 4, and as discussed herein, the projected light 246 may be a picture or image, such as the informational display images 209 and the virtual button images 210. Examples may include those images illustrated in FIGS. 1A-1L. These projected images may include work instructions, such that a worker is instructed or guided in an activity to be performed at the work area/work station 302.

In an aspect of the present invention, certain machine vision aspects of the video output of a sensor 250 may be used to enable the virtual button images 210. In an aspect of the present invention, a sensor 250 may be located close or adjacent to a lens of the projector 222. The sensor 250 is positioned such that a field-of-view 304 of the sensor 250 is sufficient to capture any motion or activity of a human subject 77 working within the work area 302, and which would encompass the corresponding projection zone of the associated sensor 250. Such an arrangement of the projector 222 and the sensor 250, with respect to a work area 302 and a worker 77 is illustrated in FIG. 3. When the worker 77 engages in activities within the work area or workstation 302, the sensor is monitoring the work area. The machine vision aspects of the video output of the sensor 250 and the controller 222 detect the worker/operator 77 interacting within/upon a virtual button image 210 (displayed by the projector 222 upon the work area/work station 302), such as by detecting the worker/operator 77 placing a finger or making a hand gesture within/upon the virtual button image 210. Such detected/determined user interaction (with the virtual button image 210) is then used by the controller 220 as an input that the particular virtual button has "selected" by the worker/operator 77. For example, an exemplary virtual button image 210 may be configured to indicate to the controller 220 that the worker/operator 77 is ready to start a task, that a task step has been completed, or that a current task is being paused. In an aspect of the present invention, a particular virtual button image 210a may be "programmed" for a particular indication (e.g., start or stop a task) by assigning a text (e.g., "start/stop") to be displayed by the projector 222, such that when a worker/operator 77 is detected or determined to have interacted with the "start/stop" virtual button image 210a, the controller 220 interprets the detected interaction with the virtual button image 210a, as an indication by the worker/operator 77 to start or stop the task (depending on context).

In aspect of the present invention, informational display images 209 are augmented reality images. Examples include placing graphics, text, numerical displays, computer-aided design (CAD) images, and even videos, such that the augmented reality images 209 are superimposed upon the work area 302 by the projected indicating lights 246 of the projector 222. These augmented reality images 209 may be similar in content to the geometric shapes illustrated in FIGS. 1A-1L, as well as other images, text, and shapes, as discussed herein. As also discussed herein, these augmented reality images 209 may be used to provide work instructions to guide the worker 77 performing one or more tasks in the work area/work station 302. These work instructions may be a sequenced series of augmented reality images 209 that incrementally walk through work instructions for a particular work task.

The augmented reality images 209, which may include work instructions, may be sequentially projected directly onto the work area/work station 502 based on the programming (defined by the software system 205) of the images 209 for display by the projector 222.

Figure 5:
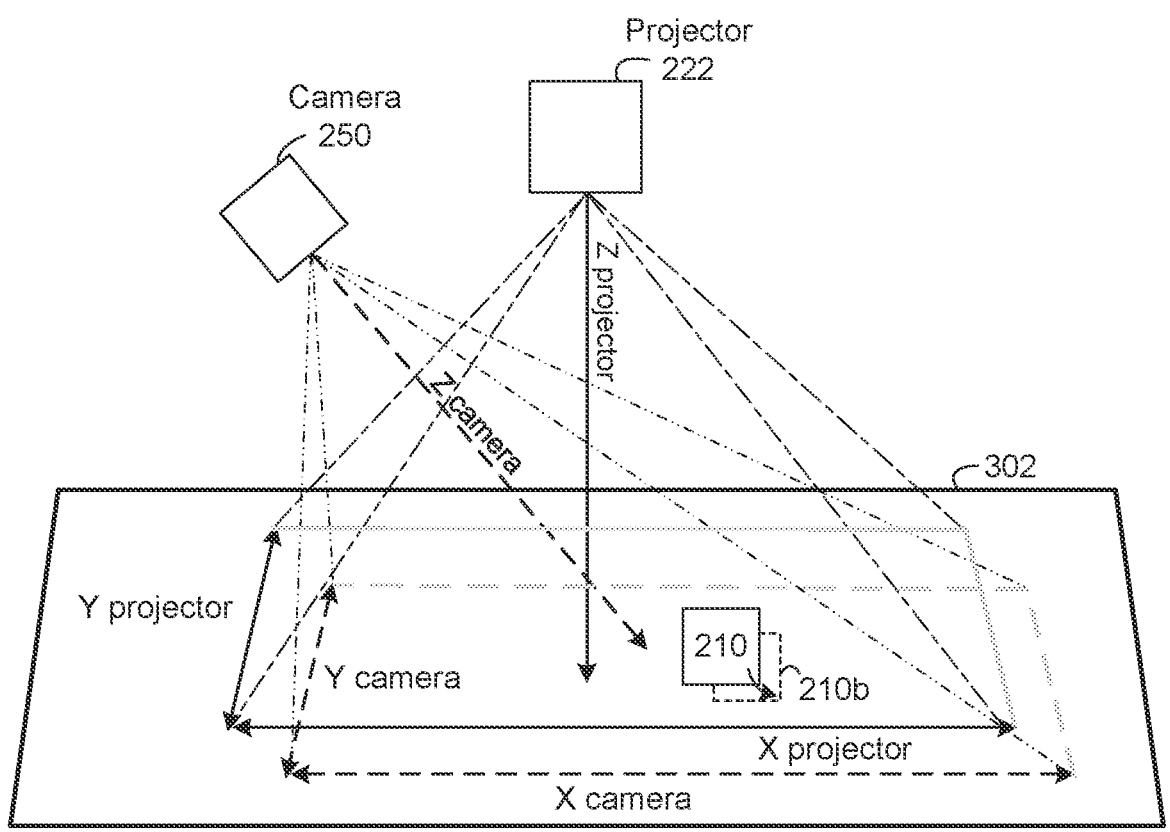
FIG. 5 is another perspective view of the positioning of the projector and sensor with respect to a work area in accordance with the present invention.

Once the augmented reality images 209 are projected onto the work area/work station 302, the augmented reality images 209 may be modified to better align to physical objects, to be more comfortably viewed by the operator 77 at the work area/work station 302, or other considerations. For example, as illustrated in FIGS. 4 and 5, augmented reality image 209a has been repositioned, while augmented reality image 209b has been enlarged. Other changes or adjustments to the augmented reality images 209 are also possible. For example, the virtual button 210, once projected onto the work area/work station 302, may also be modified to better align to physical objects or adjusted according to other criteria or necessity. As also illustrated in FIG. 4, the virtual button image 210b has been adjusted from its original position (virtual button image 210).

With reference to FIG. 5, in existing projected based augmented reality (AR) systems utilizing "virtual button" functionality, the locations of the 2D visual (the projector 222) and 3D depth sensor (the sensor 250) tools are defined in separate pixel coordinate planes, relative to the bounds of the projection field-of-view and the sensor field-of-views as they intersect with a common plane, usually a tabletop (e.g., work area/work station 302). The relative positions of the projector 222 and the sensor 250 of FIG. 5 are exaggerated, however, even if the projector 222 and the sensor 250 were adjacent (see FIGS. 4 and 4A), the projector field-of-view and the sensor field-of-view would not have the same geometry because they cannot be effectively mounted in space at the same position or angle to the work area/workstation 302. Thus, these coordinate planes will not be identical, and points cannot be shared between the two coordinate planes without calibrating the two planes either to one another, or to a shared common plane. In an aspect of the present invention, multiple projectors 222 or sensors 250 may be used to cover a larger area, with overlap between them, which further complicates the relationship between the projector(s) 222, sensor(s) 250, and physical space. In an exemplary embodiment illustrated in FIG. 4, the projector 222 and sensor 250 are positioned nearly side-by-side (within separate housings). In an alternative embodiment illustrated in FIG. 4A, the projector 222 and sensor 250 are arranged adjacent each other within a common housing 402.

Such virtual buttons are used in projector-based augmented reality solutions, where the projected virtual button image 210 is monitored by a camera or sensor that monitors the virtual button image 210 for interaction by a user (e.g., machine vision technologies used to detect the presence of a user's hand/finger covering all or a portion of a virtual button, indicating that the user has "pressed" the virtual button). A conventional method for enabling virtual buttons includes the separate creation of a two-dimensional visual (projected image) and a three-dimensional depth sensor tool (that is, the projected image and the 3D depth sensor tool are independent). Thus, if the virtual button's image 210 needs to be moved to another location within the work area/workstation 302, the user must adjust their 3D depth sensor tool to match the new location in space. This takes additional time (to adjust the 3D depth sensor tool) and also introduces more opportunities for mistakes by the user. Exemplary embodiments of the proposed methods for creating and calibrating virtual buttons will eliminate the need to manually reconfigure the 3D depth sensor tool after relocating the 2D visual tool, instead, this recalibration will be performed automatically (and without manual recalibration).

To simplify the calibration of the sensor 250 to the projector 222, in one exemplary embodiment, the sensor's coordinate system may be calibrated, along with the coordinate system of the projector 222, to a shared 2D work area/workstation 302 (e.g., a tabletop or other surface). One exemplary process for calibrating a sensor 250 to a projector 222 includes a 2D homography estimate using calibration points. Accordingly, the following terminology is used:

(x, y, z) points in real-world space will be notated as: (x, y, z).

(x, y) points in projector space will be notated as: ($X_{PRO}$, $Y_{PRO}$).

(x, y, z) points in camera (or sensor) space will be notated as ($X_{CAM}$, $Y_{CAM}$, $Z_{CAM}$).

A variety of conventional mathematical models can be used to represent these points in real-world space, points in projector space and points in camera (or sensor) space. For example, an exemplary set of points in projector space ($X_{PRO}$ and $Y_{PRO}$) can be expressed as an exemplary function of real-world (x, y) as follows:

$$X_{PRO} = \frac{ax + by + c}{gx + hy + 1} \quad Y_{PRO} = \frac{dx + ey + f}{gx + hy + 1}$$

This and other similar mathematical models are used by CAD and similar 3D programs to map the three-dimensional real world to two dimensions for the program. Thus, there are a variety of mathematical models, which may be referred to as sensor equations and projector equations, for mapping between the 3D real world and the sensor world and between the 3D real world and the projector world. In addition, the exemplary mathematical models can adjust for lens distortion or other things that cause sensors and projectors to deviate from ideal models. The resulting matrix requires a minimum four (4) sets of projector space coordinate points and camera space coordinate points ($X_{PRO}$, $Y_{PRO}$), as well as four (4) sets of real-world space coordinate points (x, y, z). As above, increasing the number of calibration points would improve the accuracy of the calibration. The same process can be used to find the relation of ($X_{PRO}$, $Y_{PRO}$) to (x, y) or (x, y, z) as well. Considering real-world space is shared between the camera space and the projector space, 2D and 3D calibration methods can also be used to compare these spaces in relation to one another.

Figure 6:
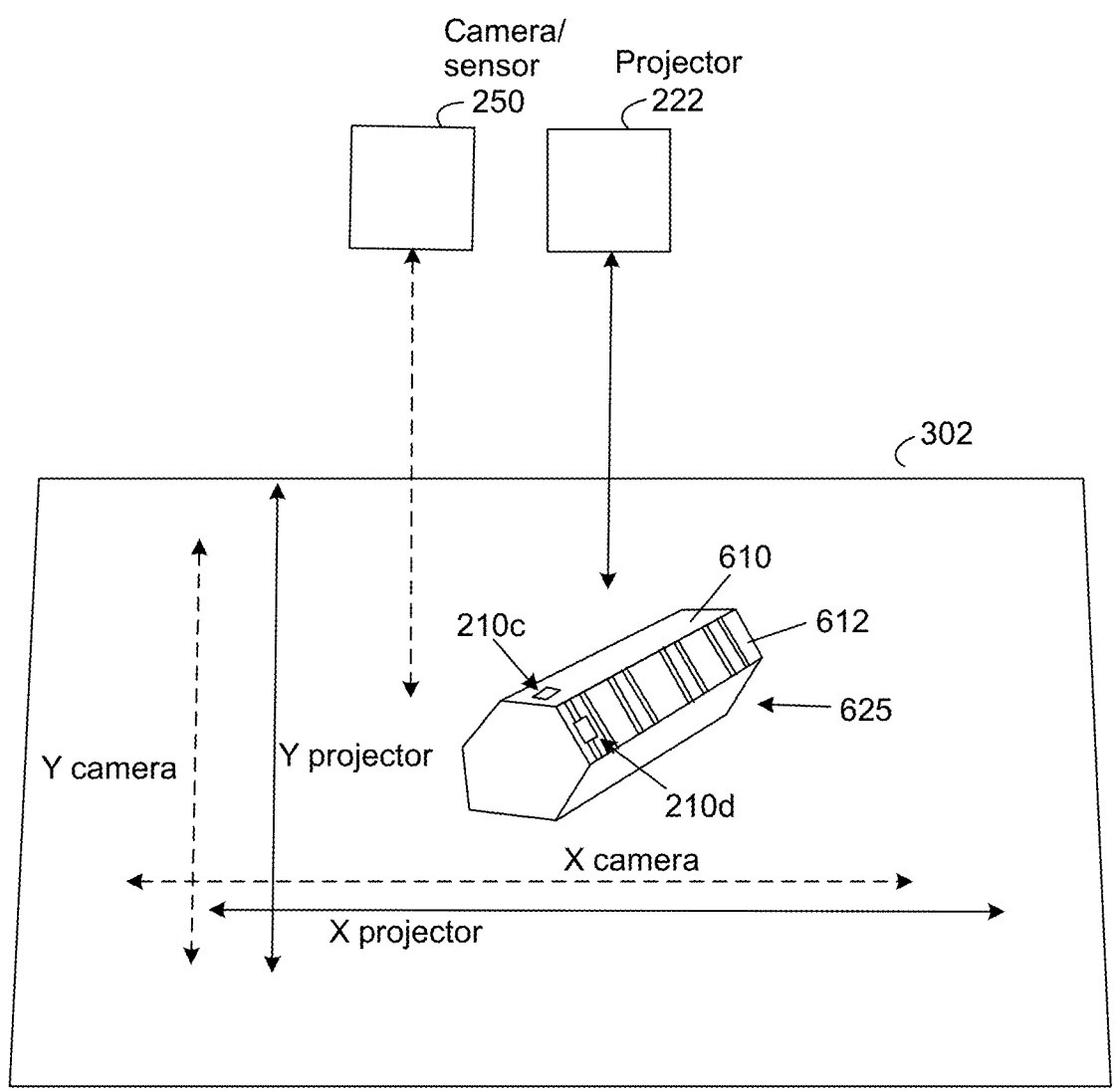
FIG. 6 is a perspective view of the positioning of the projector and sensor with respect to an article of manufacture positioned upon a work area of an assembly line in accordance with the present invention.

Other calibration methods can also be used to obtain the same calibration data. One of such methods is checkerboard calibration. Another method may also be used to calculate the $Z_{CAM}$ parameter in the future or used to place the "virtual button" on a non-planar surface (e.g., an engine block or other non-planar or irregularly surfaced article of manufacture). As illustrated in FIG. 6, a virtual button image 210c may be placed upon a planar surface of an engine block 625, or alternatively, another virtual button image 210d may be placed upon a non-planar surface of the engine block 625. As illustrated in FIG. 6, the engine block 625 is positioned within/upon a work area/workstation 302 that is within the fields-of-view of a projector 222 and a sensor 250. For the purposes of the exemplary embodiments described herein, the user experience should be similar using any of these calibration methods. Other display images 209 would also be projected upon the surface of the work area/workstation 302 and/or upon the work product (e.g., an engine block 625). Other exemplary methods include using a laser for coordinate inputs. Furthermore, different coordinate systems are also considered in addition to the Cartesian coordinate system (x,y,z) discussed herein, for example, the cylindrical coordinate system (radius, height, angle) and the spherical coordinate system (radial distance, polar angle, azimuthal angle). Thus, the methods discussed herein may be generalized to other coordinate systems.

The resulting "Dynamic Smart Button (DSB-max)" smart button functionality tool will include both the calibration coefficients for the sensor 250 and for the projector 222. Configuring the DSB-max tool will involve a calibration routine which will walk the user through the process of locating real-world coordinates in space. The user will be asked to align a series of 2D visuals and a 3D vision tool to the same corresponding real-world locations or real-world coordinate points. For example, e.g., aligning ($X_{PRO}$, $Y_{PRO}$) and ($X_{CAM}$, $Y_{CAM}$, $Z_{CAM}$) coordinate points to a set of real-world coordinate points (x, y, z), and then repeating as many times as necessary to build calibration data. This calibration data would be developed for the projector 222 (i.e., 2D visuals), the sensor 250 (3D vision tool), and the work area/workstation 302 (upon which the real-world coordinate points (x, y, z) are laid). Alternatively, the ($X_{PRO}$, $Y_{PRO}$) and ($X_{CAM}$, $Y_{CAM}$, $Z_{CAM}$) coordinate points could be aligned to each other. On a planar surface, 4 points can be suitably chosen to calibrate a sensor directly to a projector without knowing the corresponding real-world coordinates. This would be a more efficient way to calibrate a single sensor to a single projector, but less efficient than using a real-world coordinate system to calibrate multiple sensors to a projector, or multiple projectors to a sensor. Alternatively, if the workpiece is laid out as a grid, then numeric grid coordinates (e.g., row number and column number increments) could be used instead of standard units of length (i.e., millimeters or inches).

The number and locations of these coordinate points will depend on the number of and mounting positions of the projector 222 and sensor 250, as well as the calibration method chosen (a number of calibration methods are discussed herein). The number and locations of these coordinate points for calibration data will also depend on the surface of the work area/workstation 302 and the surface of the object upon which any virtual buttons 210 are to be placed (i.e., there may be portions of the object that are non-planar or irregular).

A first exemplary calibration method includes the use of a sensor/projector pair that are calibrated to each other. In one example the sensor/projector pair come from the factory calibrated to each other. Alternatively, they can be received separately, bonded together and then calibrated to each other before use. A second exemplary method includes a sensor and projector that are separately calibrated to the real world. Thus, there would be a sensor calibration and a projector calibration, with these calibrations then calibrated to each other (e.g., a sensor calibration to the projector calibration). With two of these three calibrations determined, the third calibration can be readily acquired. With respect to the number of calibration points, the minimum number of points is dependent upon the type of calibration. For example, while a 2D topographical calibration requires a minimum of four (4) points (e.g., in the corners of a table), a 3D calibration requires a minimum of six (6) points, four (4) points in a sample plane, and the remaining two (2) points outside the plane defined by the other four points. That is, for 3D calibration, no more than four (4) out of six (6) points can be in a single plane, and the distance between each of those points should be as dispersed from each other as possible within the projector or sensor field of view. That is, the further the two points are away from the plane (defined by the other four), the lower the risk of mathematical errors. For each point, the system coordinates for the sensor and the projector are determined.

In an exemplary calibration method, an exemplary projector system guides a user through the calibration steps, guiding the user to determine corresponding coordinate points for both the sensor and projector in turn at each of the selected points as they are projected in the real world. The resultant sensor and projector coordinates for each of the points in the real world are recorded and used to calibrate the projector and the sensor to the real-world terrain. For example, an object is placed into the projector space and then marked off in physical space with a known location. This is repeated for each required point. Those points are also repeated for the sensor. In 3D calibration, six (6) points are placed on a real object in six (6) places where the x,y,z coordinates of the real object are known. These x,y,z coordinates may be entered into the calibration software so that the controller knows the x,y,z coordinates. Meanwhile, the calibration system is aware of the x,y coordinates, based on its own storage of the x,y coordinates as the projector is projecting the graphic. While the controller performs the math, the user inputs the x,y,z coordinates. Other exemplary calibration methods include the use of an initial number of points, e.g., 1000 points, are presented. A subset of points are selected, e.g., eight (8) points, and these 8 points are lined up with known points. Another exemplary calibration method includes the use of a fixture that the sensor is trained to recognize, such that the sensor knows the x,y,z coordinates of the fixture at all times. The sensor can then send the x,y coordinates to the controller. The fixture can then be placed in a known spot and use that to make the projector's coordinates known. The fixture can then be moved to each of the 6 spots (for the 6 points) and coordinates of the sensor and projector are stored. In yet another alternative, a robot could be used with an end-effector with known x,y,z coordinates. The end-effector is moved in space and the sensor and projector are calibrated to those positions.

Once the coordinate systems (with respect to the sensor field-of-view and the projector field-of-view) have been calibrated, they will be stored for later recall. This DSB-max calibration will apply to any additional virtual buttons 210 created using the same system (projector 222, sensor 250, work area/workstation 302).

The 2D visual (the visual image for a virtual button 210) would then need to be created in the AR work instruction authoring software and linked to the DSB-max calibration. This could then be used to create a new, corresponding 3D vision tool that would also be tied to the DSB-max calibration. Depending on the calibration method chosen, the depth ($Z_{CAM}$) range of the 3D vision tool will likely need to be configured manually. This is with respect to 3D calibration that would provide the z-axis coordinate along with the x,y coordinates. For example, if a box (or other similar shape) is placed upon the work surface and a projected virtual button image 210 was repositioned upon the box, the new height would not be automatically known. The change in height for the virtual button image 210 would need to be accommodated for. As is well known in the art, there are a variety of different methods for determining/updating the z-axis coordinate. The depth ($Z_{CAM}$) range is the z-axis range of the sensor from the virtual button image 210. Thus, the z-axis range will need to be updated or accommodated for when the height of the projected virtual button image 210 changes.

In an exemplary method for updating the $Z_{CAM}$, a dynamic baseline filter may be used that subtracts out the depth information and just detects changes to the depth information and adjusts for any changes in depth information on a pixel-by-pixel basis. Thus, if the sensor is on an angle with respect to an object in the real world, some of the pixels may be 1 meter away, while some others might be 1.5 meters away. In this exemplary method, the system will set them all to 2 meters away. If the 1-meter pixels start measuring 1.1 meters away, they will be adjusted to 2.1 meters. Similarly, if the 1.5-meter pixels start measuring 1.6 meters away, they will also be adjusted to 2.1 meters. Therefore, rather than adjusting for the terrain, the exemplary system accommodates for the terrain of the physical object in the real world. An adaptive filter can be used to adjust the depth, or in the alternative, the depth may be manually adjusted.

In an exemplary method, the sensor calibration and projector calibration can be periodically adjusted to account for any shifting of the positions of the real world x,y,z coordinates. Such shifting may occur if the work surface (e.g., a table) was shifted or bumped. Other variables may affect the calibrations, such as random adjustments needed to account for random shifts in the sensor calibration or the projector calibration as the system warms. Such random shifting can cause a shifting of a couple pixels. For example, a classical or machine learning algorithm or process can be used to detect that the hand usually only covers a portion (e.g., the right side) of the vision tool and to adjust the tool in that direction (e.g., to the right) in order to better detect the hand. This can automatically accommodate small shifts in the sensor and/or projector location over time, or small shifts in the work surface.

Figure 7:
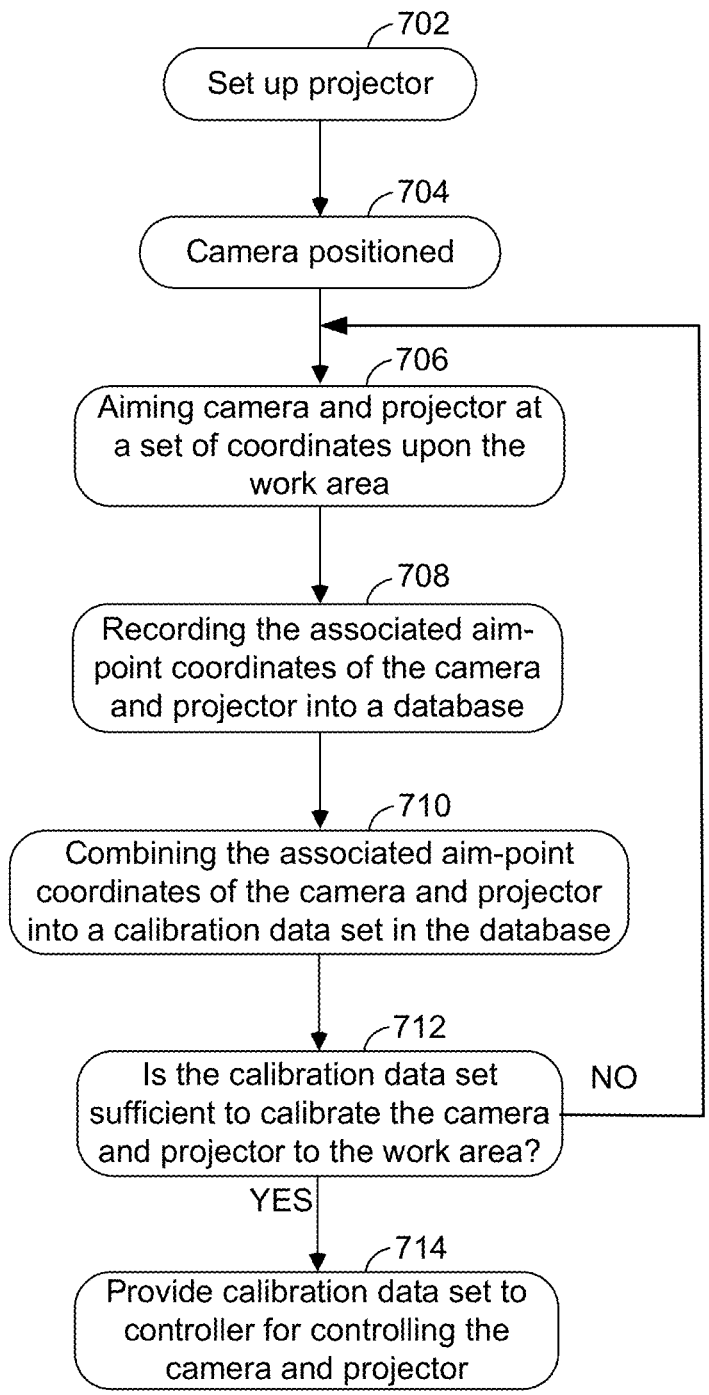
FIG. 7 is a flow diagram illustrating the steps to a method for calibrating a sensor and projector to a work area.

FIG. 7 is a flow diagram illustrating the steps to a method for calibrating a sensor 250 and projector 222 to a work area/workstation 302. In step 702, the projector 222 is positioned with respect to the work area/workstation 302, while in step 704, the camera or sensor 250 is positioned with respect to the projector and with respect to the work area/workstation 302. If a sensor/projector combination package 402 (see FIG. 4A) is used, then steps 702 and 704 would be combined.

In step 706, the camera or sensor and projector are aimed at a set of coordinates upon the work area/workstation 302. In step 708, the associated aim-point coordinates of the sensor 250 and projector 222 are recorded into a database. In step 710, the associated aim-point coordinates of the sensor 250 and projector 222 are combined into a calibration data set in the database. If there is already a calibration data set in the database, then the new coordinates (for the camera/sensor and projector) are appended/applied to the calibration data set.

In step 712, it is determined whether the calibration data set is sufficient to calibrate the sensor 250 and projector 222 to the work area/workstation 302. If the calibration data set is sufficient, the process continues to step 714, where the calibration data set is provided to the controller 220 for controlling the sensor 250 and projector 222. If the calibration data set is insufficient, the process returns to step 706 and the sensor 250 and projector 222 are aimed at another set of coordinates upon the work area/workstation 302.

Once the 2D visual and 3D vision tool are configured initially, any changes to the ($X_{PROJ}$, $Y_{PROJ}$) location of the virtual button image 210 utilizing the DSB-max tool will be automatically reflected in the corresponding 3D vision tool's ($X_{CAM}$, $Y_{CAM}$) location with no manual input or configuration from the user 77 (see FIG. 5). Thus, no recalibration is necessary when the location of a virtual button image 210 is adjusted. As discussed above, any shifting of the position of the virtual button image 210, due to changing terrain upon which the virtual button image 210 is placed, can be accommodated for.

With the introduction of the third dimension in the calibration routine (the inclusion of $Z_{CAM}$ coordinate points as part of an x,y,z point cloud for the sensor 250), there is also the ability to adjust the shape of the visual to accommodate for any changes in the projection on different parts of the work area/workstation 302 (e.g., when a virtual button 210 is projected upon an irregularly shaped engine block positioned upon the work area/workstation 302). See FIG. 6, where an engine block 625 is positioned upon a work area/workstation 302, and with a pair of virtual buttons 210c, 210d positioned upon the engine block 625 (i.e., with the virtual button 210c positioned upon a planar surface 610 of the engine block 625, while the virtual button 210d positioned upon a non-planar surface 612 of the engine block 625). With additional tools, this could also be used to track both the 2D visual and 3D vision tool to the surface itself, moving the virtual button image 210 if the projection surface is moved or rotated.

In an alternative embodiment illustrated in FIG. 4A, a sensor 450 is mounted together with a projector 422 in a single package 402. The package 402 would be arranged within an alternative guide system 400 with a controller 420 for controlling the sensor 450 and projector 422 (see FIG. 4A). The controller 420 is similar to the controller 220 discussed herein. Such an arrangement of sensor 450 and projector 422 would allow for a simpler set of coordinate points for the sensor 450 and projector 422, as fewer data sets would be needed for a calibration data set. As discussed herein, when the sensor 250 and projector 222 are positioned away from each other (FIG. 5), more coordinate points (($X_{PRO}$, $Y_{PRO}$) and ($X_{CAM}$, $Y_{CAM}$, $Z_{CAM}$) aligned to (x, y, z)) would be needed for the required calibration data.

With a sufficient set of calibration data between the sensor 250, the projector 222, and the work area/workstation 302, when an exemplary virtual button 210 is to be projected onto an irregular surface or a curved surface, the projected virtual button 210 can be adjusted to remove distortion.

Thus, by linking together calibration data for the projector 222 and the sensor 250, by aligning coordinate points ($X_{PRO}$, $Y_{PRO}$) and ($X_{CAM}$, $Y_{CAM}$, $Z_{CAM}$) to a set of real-world coordinate points (x, y, z) (to several sets of points (e.g., four (4)), a virtual button 210 may be repositioned anywhere within the shared fields-of-view of the projector 222 and sensor 250 without requiring a recalibration to account for the new position of the virtual button 210b (see FIGS. 4 and 5).

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A light guide system for a work area in an assembly line comprises:
    a projector configured to project a first light indicator at one or more selected locations in a work area, wherein the light indicator is a graphical geometric shape;
    a sensor positioned with respect to the projector, wherein the sensor is positioned to have a field of view that includes a selected portion of the work area, wherein the sensor is configured to capture video of the actions of a first worker performing a task at the work area, and wherein the captured video comprises encoded data; and
    a controller comprising a memory and configured to control the projector and monitor the captured video of the sensor;
    wherein the controller is configured to monitor the captured video for the first worker to place a hand or a finger over the projected first light indicator, wherein the controller is operable to determine that the first worker's hand or finger over the projected first light indicator is a user selection, wherein the graphical geometric shape indicates a selectable feedback indication, and wherein the graphical geometric shape is a virtual button;
    wherein the controller is configured to direct the projector to reposition the first light indicator to a different target location in the work area;
    wherein the controller is configured to use calibration data stored in the memory to maintain a calibration of the sensor and projector to the work area, wherein the calibration of the projector and the sensor comprises the projector projecting the first light indicator to a first location in the work area, and wherein the controller is configured to direct the projector to move the first light indicator from the first location to a newly selected location in the work area due to a movement or an orientation of a workpiece positioned upon a work surface within the work area, and without requiring a recalibration of the sensor and projector with respect to the work area.

2. The light guide system of claim 1, wherein the graphical geometric shape of claim 1 comprises at least one of numbers, words, alphanumeric characters, and a drawing image, and wherein the graphical geometric shape defines a particular user feedback indication.

3. The light guide system of claim 2, wherein the user feedback indication defines a work status.

4. The light guide system of claim 1, wherein the controller comprises a programmable logic controller.

5. The light guide system of claim 1, wherein the sensor and projector are positioned adjacent each other within a single housing.

6. The light guide system of claim 1, wherein the sensor and projector are positioned adjacent each other within separate housings.

7. The light guide system of claim 1, wherein the sensor and projector are positioned with respect to each other.

8. The light guide system of claim 1 further comprising a plurality of projectors, each configured to project associated light indicators at one or more additional targeted locations in the work area, wherein at least two of the plurality of projectors have overlapping fields of view, wherein each of the associated light indicators are graphical geometric shapes.

9. The light guide system of claim 8 further comprising a plurality of sensors, each positioned with respect to at least one of the plurality of projectors, wherein each of the sensors is positioned to have a corresponding field of view of a selected portion of the work area, wherein each of the sensors is configured to capture video of the actions of the first worker performing a task at the work area.

10. The light guide system of claim 9, wherein each sensor of the plurality of sensors is positioned adjacent to the corresponding projector of the plurality of projectors, with each sensor/projector pair contained within a respective single housing.

11. The light guide system of claim 9, wherein each sensor of the plurality of sensors is positioned adjacent of the corresponding projector of the plurality of projectors, with each sensor and projector contained within separate respective housings.

12. The light guide system of claim 9, wherein each sensor of the plurality of sensors is positioned with respect to the corresponding projector of the plurality of projectors.

13. The light guide system of claim 1, wherein the sensor is a 3D sensor and is configured to generate a 3D point cloud, and wherein the 3D point cloud comprises 3D encoded data.

14. A method for calibrating a sensor and projector for a light guided assembly system configured to project visual indicators onto a work area to guide actions of a worker, wherein the method comprises:
   positioning a projector configured to project a light indicator at one or more selected locations in the work area;
   positioning a sensor with respect to the projector such that the sensor's field of view includes a selected portion of the work area, wherein the sensor is configured to capture video of the actions of a first worker performing a task at the work area, and wherein the captured video comprises encoded data;
   aiming the sensor and projector at a first set of coordinates upon the work area and recording the associated aim-point coordinates of the sensor and projector into a memory; and
   repeating the aiming of the sensor and projector at a plurality of additional sets of coordinates upon the work area and recording each of the associated aim-point coordinates of the sensor and projector into the database until a sufficient quantity of associated aim-point coordinates for the sensor and projector have been collected to form a calibration data set sufficient to calibrate the sensor and projector to the work area such that a light indicator projected at a selected location in the work area can be moved from the selected location to an alternative location due to a movement or an orientation of a workpiece positioned upon a work surface within the work area without requiring the projector and sensor to be recalibrated.

15. The method of claim 14, wherein the calibration data set is a matrix comprising at least four sets of projector aim-point coordinates, at least four sets of sensor aim-point coordinates, and four sets of corresponding work area coordinates upon which the sensor and projector were aimed.

16. The method of claim 14 further comprising storing the database into a memory of the light guided assembly system.

17. The method of claim 14, wherein the sensor and projector are positioned adjacent each other within a single housing.

18. The method of claim 14, wherein the sensor and projector are positioned adjacent each other within separate housings.

19. The method of claim 14, wherein the sensor and projector are positioned with respect to each other.

20. The method of claim 14, wherein the sensor is a 3D sensor and is configured to generate a 3D point cloud, and wherein the 3D point cloud comprises 3D encoded data.

* * * * *